United States Patent
Bucknell

(10) Patent No.: US 8,301,761 B2
(45) Date of Patent: Oct. 30, 2012

(54) DETERMINING SERVER LOAD CAPACITY WITH VIRTUAL USERS

(75) Inventor: Graham Bucknell, Pyrmont (AU)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 12/415,369

(22) Filed: Mar. 31, 2009

(65) Prior Publication Data

US 2010/0250732 A1    Sep. 30, 2010

(51) Int. Cl.
*G06F 15/16*  (2006.01)
*G06F 15/173* (2006.01)
*G06F 15/177* (2006.01)

(52) U.S. Cl. .......... 709/224; 709/219; 718/105; 714/15; 714/25; 714/57

(58) Field of Classification Search .......... 709/217–228; 718/105; 714/15, 25, 57
See application file for complete search history.

(56) References Cited

U.S. PATENT DOCUMENTS

| | | | | |
|---|---|---|---|---|
| 7,620,856 B2 * | 11/2009 | Kagan et al. | | 714/57 |
| 7,657,401 B2 * | 2/2010 | Dawson et al. | | 702/186 |
| 7,757,117 B2 * | 7/2010 | Mittal et al. | | 714/15 |
| 2006/0224731 A1 * | 10/2006 | Haga et al. | | 709/224 |
| 2007/0288625 A1 * | 12/2007 | Chakra et al. | | 709/224 |
| 2008/0167840 A1 * | 7/2008 | Francis et al. | | 703/2 |
| 2009/0031066 A1 * | 1/2009 | Bansal et al. | | 710/113 |
| 2009/0210513 A1 * | 8/2009 | Boss et al. | | 709/219 |
| 2009/0235117 A1 * | 9/2009 | Mooney et al. | | 714/25 |
| 2009/0271152 A1 * | 10/2009 | Barrett | | 702/186 |
| 2010/0131960 A1 * | 5/2010 | Suganthi et al. | | 718/105 |
| 2010/0223190 A1 * | 9/2010 | Pedersen et al. | | 705/305 |

OTHER PUBLICATIONS

Choi et al., "Workload Distribution and Performance Analysis Simulation for a Distributed Server Cluster System," Journal of the Korea Society for Simulation (vol. 12, Issue 4), pp. 103-111; Dec. 2003, (English Abstract Included).

* cited by examiner

*Primary Examiner* — Haresh N Patel
(74) *Attorney, Agent, or Firm* — Holland & Knight LLP; Brian J. Colandreo, Esq.; Jeffrey T. Placker, Esq.

(57) ABSTRACT

A method, computer program product, and system for determining a number of users corresponding to a server load including simulating one or more virtual users on a test computer system on coupled to network. One or more client requests are sent from each of the one or more virtual users to a server application executed on a server computer system coupled to the network. A metric indicative of a load on the server computer system is measured. The metric is compared to a predetermined value; and the number of the one or more virtual users is changed based on the difference between the metric and the predetermined value until the metric is within a predetermined range of the predetermined value.

13 Claims, 2 Drawing Sheets

DETERMINING SERVER LOAD CAPACITY WITH VIRTUAL USERS

BACKGROUND OF THE INVENTION

This disclosure relates to computer test systems and, more particularly, to computer test systems for determining a server load.

Server computers often provide services to many users at the same time. Sometimes many users trying to access a server at the same time can overload the server. This can cause the server to experience delays in service, or fail altogether. One way to avoid these failures is to understand the limits of a server and design the server, or a system of servers, to handle an expected load.

Testing a server may include sending test traffic and test client requests, generated by virtual users, to the server. Some of these methods create network traffic by simulating user traffic and client requests, and measuring the response of the server under test. However, to effectively design a server or system of servers to handle an expected load, the designer may need to understand the server load associated with a particular operating point. For example, a designer may require, for the purposes of designing a robust server system, that the servers never operate above a particular capacity, say 80% capacity. In this case, it is desirable to understand what type of load will cause the server to operate at 80% capacity.

BRIEF SUMMARY OF THE INVENTION

In an embodiment, a method of determining a number of users corresponding to a server load includes simulating one or more virtual users on a test computer system on coupled to network. One or more client requests are sent from each of the one or more virtual users to a server application executed on a server computer system coupled to the network. A metric indicative of a load on the server computer system is measured. The metric is compared to a predetermined value, and the number of the one or more virtual users is changed based on the difference between the metric and the predetermined value until the metric is within a predetermined range of the predetermined value.

One or more of the following features may be included. The metric may be indicative of a load on one or more processors of the server computer system. Measuring the metric may include periodically measuring the metric and storing each measurement in a memory. The method may calculate a running average of the metric and/or apply a low pass filter to the metric. The metric may be provided by a Windows® Management Instrumentation service, and rstat.d performance measurement service, and/or a custom performance measurement tool executing on the server computer system (Windows is a trademark of Microsoft Corporation, in the United States, other countries, or both). Also, changing the number of the one or more virtual users may include changing the number of the one or more virtual users based on a percentage difference between the metric and the predetermined value.

In another embodiment, a computer program product for determining a number of users corresponding to a server load resides on a computer readable medium. Computer instructions of the computer program product, when executed by a processor, cause the processor to perform operations including simulating one or more virtual users on a test computer system on coupled to network. One or more client requests are sent from each of the one or more virtual users to a server application executed on a server computer system coupled to the network. A metric indicative of a load on the server computer system is measured. The metric is compared to a predetermined value, and the number of the one or more virtual users is changed based on the difference between the metric and the predetermined value until the metric is within a predetermined range of the predetermined value.

One or more of the following features may be included. The metric may be indicative of a load on one or more processors of the server computer system. Measuring the metric may include periodically measuring the metric and storing each measurement in a memory. The operations may calculate a running average of the metric and/or apply a low pass filter to the metric. The metric may be provided by a Windows Management Instrumentation service, and rstat.d performance measurement service, and/or a custom performance measurement tool executing on the server computer system. Also, changing the number of the one or more virtual users may include changing the number of the one or more virtual users based on a percentage difference between the metric and the predetermined value.

In another embodiment, a system for determining a number of users corresponding to a server load includes one or more processors, one or more memories, and one or more software instruction sets stored on the one or more memories which, when executed by the one or more processors, cause the one or more processors to perform operations including simulating one or more virtual users on a test computer system on coupled to network. One or more client requests are sent from each of the one or more virtual users to a server application executed on a server computer system coupled to the network. A metric indicative of a load on the server computer system is measured. The metric is compared to a predetermined value, and the number of the one or more virtual users is changed based on the difference between the metric and the predetermined value until the metric is within a predetermined range of the predetermined value.

One or more of the following features may be included. The metric may be a measurement of a load on one or more processors of the server computer system. Measuring the metric may include periodically measuring the metric and storing each measurement in a memory. The operations may calculate a running average of the metric and/or apply a low pass filter to the metric. The metric may be provided by a Windows Management Instrumentation service, an rstat.d performance measurement service, and/or a custom measurement tool executing on the server computer system. Also, changing the number of the one or more virtual users may include changing the number of the one or more virtual users based on a percentage difference between the metric and the predetermined value.

BRIEF DESCRIPTION OF THE SEVERAL VIEWS OF THE DRAWINGS

Like references in the drawings denote like elements.

DETAILED DESCRIPTION OF THE INVENTION

Figure 1:
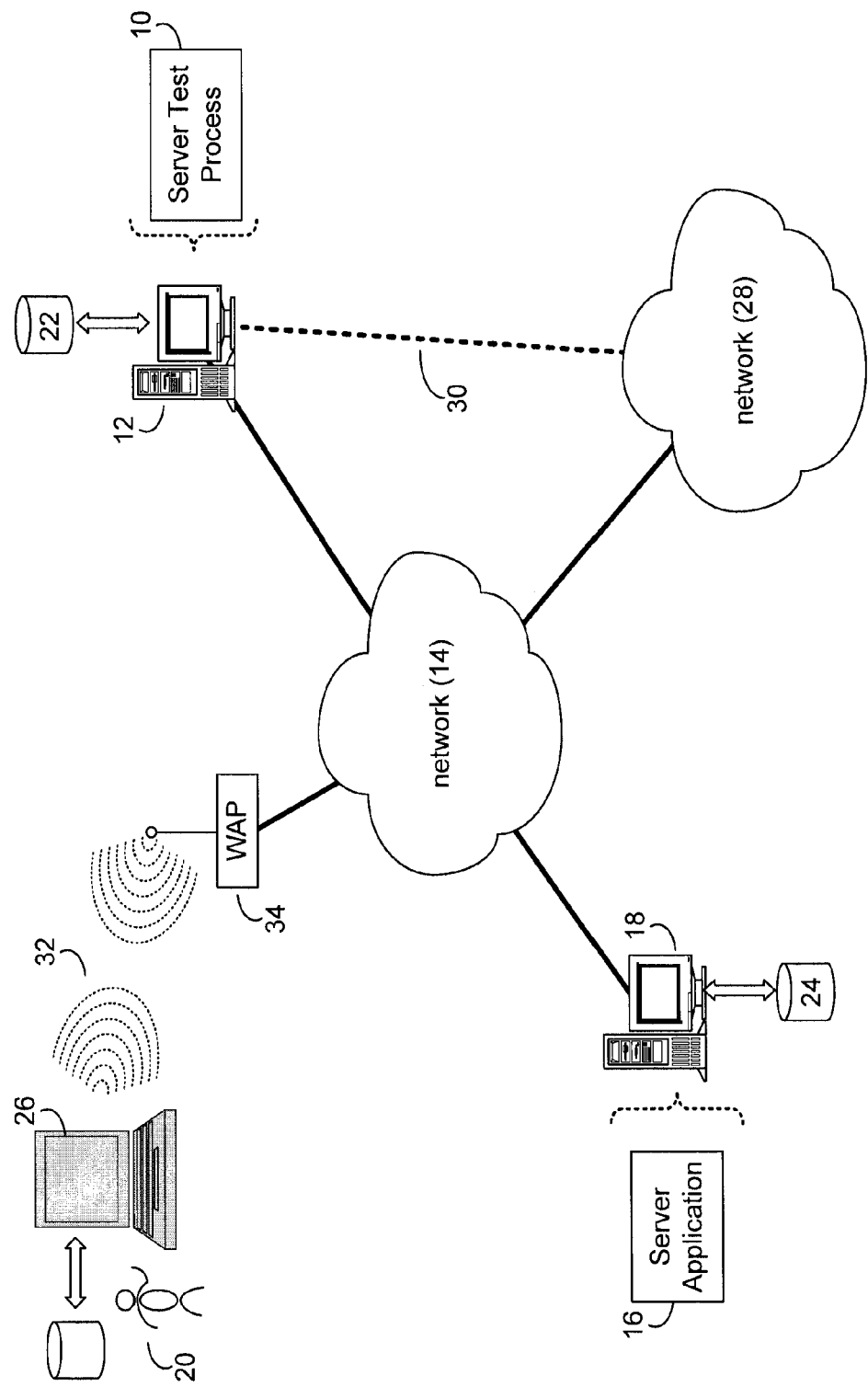
FIG. 1 is a diagrammatic view of a server test process coupled to a distributed computing network.

FIG. 1 depicts server test process 10, which may reside on and may be executed by test computer 12, which may be connected to network 14 (e.g., the Internet or a local area network). Examples of test computer 12 may include, but are not limited to: a personal computer, a server computer, a series of server or personal computers, a mini computer, and a mainframe computer.

FIG. 1 also depicts server application 16, which may reside on and may be executed by server computer 18. Server computer 18 may also be connected to network 14, as shown. Examples of server computer 18 may also include, but are not limited to: a personal computer, a server computer, a series of server or personal computers, a mini computer, and a mainframe computer.

Server application 16 may be any server application that accepts requests, input, or other communications from a client application. For example, server application 16 may be a web server, an application server, an ftp server, or any server that accepts requests or input from users (such as user 20). Examples of server applications include the Microsoft® IIS server and the IBM® WebSphere® server (Microsoft is a trademark of Microsoft Corporation in the United States, other countries, or both; and IBM and WebSphere are trademarks or registered trademarks of International Business Machines Corporation in the United States, other countries, or both).

Server computer 18 may run a network operating system, examples of which may include but are not limited to: Microsoft Windows XP Server; Novell® Netware®; or Redhat® Linux®, for example (Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

As will be discussed below in greater detail, server test process 10 may simulate one or more virtual users and may send one or more client requests from each of the one or more virtual users to server application 16. Server test process 10 may also measure a metric representing a load on server computer system 18 and compare the metric to a predetermined value. Server test process 10 may change the number of simulated virtual users until the metric is within a predetermined range of the predetermined value. The change in the number of simulated virtual users may be based on the difference between the metric and the predetermined value.

The instruction sets and subroutines of server test process 10, which may include one or more software modules and one or more sets of software instructions, and which may be stored on storage device 22 coupled to test computer 12, may be executed by one or more processors (not shown) and one or more memory architectures (not shown) incorporated into test computer 12. Similarly, the instruction sets and subroutines of server application 16, which may include one or more software modules and one or more sets of software instructions, and which may be stored on storage device 24 coupled to server computer 18, may be executed by one or more processors (not shown) and one or more memory architectures (not shown) incorporated into server computer 18. Storage devices 22, 24 may include but are not limited to: hard disk drives; solid state drives; tape drives; optical drives; RAID arrays; random access memory (RAM); and a read-only memory (ROM).

The instruction sets and subroutines of server test process 10 and server application 16 may be generated through the use of a compiler, such as the IBM XL compiler, the Visual Studio® compiler, or an assembler, for example (Visual Studio is a trademark of Microsoft Corporation in the United States, other countries, or both). The instruction set and subroutines may also be generated as scripts, such as JavaScript® scripts, or as other types of software code (Java and all Java-based trademarks and logos are trademarks of Sun Microsystems, Inc. in the United States, other countries, or both). In general, and as is known in the art, the instruction set and subroutines of server test process 10 and server application 16 may be generated via any method of generating instruction sets and subroutines that may be executed by a processor.

Various client electronic devices may be coupled to network 14. Examples of client electronic devices may include, but are not limited to: test computer 12, server computer 18, laptop 26, a personal digital assistant (not shown), a data-enabled, cellular telephone (not shown), and a dedicated network device (not shown). One or more users (e.g., user 20) may access the various tools and applications, such as server test process 10 or server application 16 from any device connected to network 14 or directly from the device on which the tool or application resides (e.g., directly from test computer 12 and/or server computer 18). Client electronic devices may be coupled directly to network 14, or may be indirectly coupled to network 14 through network 28. For example, test computer 12 may be indirectly connect to network 14 through secondary network 28, as illustrated by phantom link line 30.

Storage devices 22, 24 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices.

The various client electronic devices may be directly or indirectly coupled to network 14 (or network 28). For example, test computer 12 is shown directly coupled to network 14 via a hardwired network connection. Laptop 26 is shown wirelessly coupled to network 14 via wireless communication channel 32 established between laptop 26 and wireless access point (i.e., WAP) 34, which is shown directly coupled to network 14. WAP 34 may be, for example, an IEEE 802.11a, 802.11b, 802.11 g, Wi-Fi, and/or Bluetooth device that is capable of establishing wireless communication channel 32 between laptop 26 and WAP 34.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
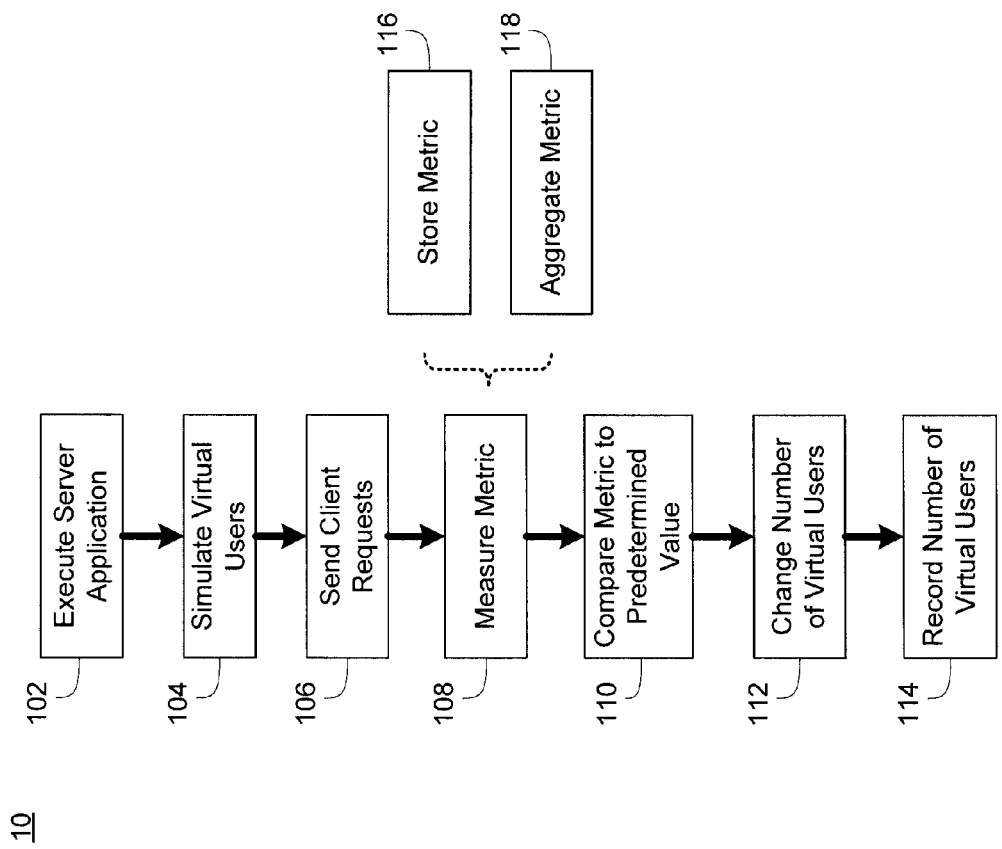
FIG. 2 is a flowchart of the test system configuration process of FIG. 1.

Referring to FIG. 2, server computer 18 may execute 102 server application 16. Server test process 10 may simulate 104 one or more virtual users and send 106 one or more client requests from each of the one or more virtual users to server application 16. Server test process 10 may also measure 108 a metric representing a load on server computer system 18 and compare 110 the metric to a predetermined value. Server test process 10 may also change 112 the number of simulated virtual users until the metric is within a predetermined range of the predetermined value. The change in the number of simulated virtual users may be based on, at least in part, the difference between the metric and the predetermined value. When the change in the number of simulated virtual users reaches a steady state, e.g. the difference between the metric and the predetermined value is small or zero and the number of virtual users is no longer changing, server test process 10 may record 114 a number of virtual users that represents the number of users associated with the predetermined value.

Server computer 18 may execute 102 server application 16. Server application 16 may be any type of server application that accepts input from a user or provides output for a user. As used herein, accepting an input from a user and/or providing an output for a user may include accepting an input from a client application (e.g., in response to a user input to the client application) and/or providing an output that may be received by a user (e.g., via the client application). In one embodiment, server application 16 may be a web server that receives web page requests from users (e.g. from user 20 via a web browser application (not shown) executed by laptop 26) and, in response, may provide a web page and/or web content to user 20 by transmitting it through network 14. However, server application 16 may be any type of server application including, but not limited to, an email server, a web server, an ftp server, a search engine, a custom server, and any other of server application.

Typically, server computer 18 may execute server application 16. In other words, server computer 18's processor may execute any instructions associated with server application 16. Executing server application 16 may consume server computer 18's processor cycles and/or other processor resources. Likewise, server application 16 may use other hardware resources, e.g., associated with server computer 18. Server application 16 may, for example, optionally utilize network connections, I/O ports, hard drive, memory, or any other hardware resource associated with server computer 18. Server application 16 may also utilize software resources, e.g., of software applications executed on server computer 18. For example, server computer 18 may provide a software encryption service. If server application 16 needs to encrypt data, for example, server application 16 may use the encryption service running on server computer 18.

The degree to which server application 16 may utilize hardware and software resources of server computer 18 may depend upon how great a load is placed on server application 16. For example, if server application 16 is busy executing a complex processing job, server application 16 may utilize more of server computer 18's CPU cycles. Likewise, if server application 16 is storing or transmitting large quantities of data, server application 16 may utilize a large portion of server computer 18's hard drive or network bandwidth. On the other hand, if server application 16 is not busy, it may use server computer 18's resources to a lesser degree. For example, if server application 16 is not storing or transmitting data, it may use server computer 18's hard drive and/or network bandwidth to a small degree, if at all.

If server application 16 accepts input from or provides output to users, then the amount of users accessing server application 16 may affect the load on server application 16 and, subsequently, the degree to which server application 16 utilizes server computer 18's hardware and software resources. For example, if many users are accessing and/or making requests of server application 16, then server application 16 may need more of server computer 18's CPU cycles to service the many users. Likewise, server application 16 may need more hard drive or network bandwidth (or any other hardware or software resource) to service the many users. As a corollary, if only a few users are accessing server application 18, then server application 18 may require less hardware and software resources to service the users. For example, if server application 16 is a web server, and if many users attempt to access the web server at the same time, then server application 16 may have to use more of server computer 18's CPU cycles to process the requests, more of server computer 18's hard drive bandwidth to retrieve the stored web pages, and more of server computer 18's network bandwidth to send requested web pages to the many users.

However, if there are too many users accessing or making requests of server application 16, then server application 16 and server computer 18 may not be able to service all the users effectively. For example, server computer 18 may run out of CPU cycles and become too busy to handle all the user requests. In this scenario, it may take longer than usual to process all the user requests. Alternatively, some user requests may be dropped by server application 16. Both situations can frustrate users who want to access a server that is running quickly and efficiently. Given server computer 18's software and hardware resources, there may by an optimal, maximum, and/or minimum operating point at which server application 16 can service users.

Accordingly, server test process 10 may simulate 104 virtual users of server application 16. Each virtual user may be a script, program, or part of a program that simulates a user of server application 16. Server test process 10 may generate network traffic and/or server requests and send 106 them to server application 16. For each virtual user, for example, server test process 10 may generate network traffic and/or server requests typical of a user of server application 16. For example, if server application 16 is a web server, the virtual users simulated by test process 10 may be typical web users—they may generate web traffic, web requests, and web downloads typical of a user browsing the web and accessing a web server, i.e. server application 16.

Server test process 10 may simulate 104 any number of users and send 106 their traffic and requests to server application 16. For example, server test process 10 may simulate 104 many users (say 100,000 users for a particular scenario), or few users (e.g. one, or even zero users, for a particular scenario). Each of these simulated virtual users may send 106 network traffic and requests to server application 16. In this way, server test process 10 may simulate a real world server use scenario. For example, if server application 16, when installed in-field, expects to receive client requests from X number of users, then server test process 10 may simulate 104x number of virtual users and send 106 client requests from the X number of simulated users to server application 16.

In one usage scenario, a developer may want to maximize the efficiency of server computer 18 by determining how many users will load server 18 to a particular degree. In other words, if a target CPU load for a particular server is specified as 80%, a developer may wish to find out how many users accessing server application 16 it will take to create a CPU load of 80%. Accordingly, server test process 10 may measure 108 a metric of server application 16 (e.g. CPU Load), compare 110 the measured metric to a predetermined value (e.g. 80%), and change 112 the number of simulated virtual users if the measured metric and the predetermined value are different.

Server test process 10 may change 112 or adjust the number of virtual users until the measured metric is the same as or within a preset margin of the predetermined value. In some cases, increasing the number of virtual users may increase the value of the measured metric. For example, server test process 10 may simulate X number of virtual users. If a target CPU load is 80%, and if server test process 10 measures 108 the CPU load at 60%, then server test process 10 may increase the X number of virtual users until the CPU load reaches 80% or comes within a preset margin of 80% (.e.g., +/−2%, or some other preset margin). Likewise, if the measured CPU load is greater than the target 80%, then server test process 10 may decrease the X number of virtual users until the CPU load reaches 80% or comes within a preset margin of 80%.

In other cases, increasing the number of virtual users may actually decrease the value of the measured metric. Take, for example, the case where the measured metric is CPU idle time. If the target CPU idle time is 20%, and the measured CPU idle time is 30%, then server test process 10 may increase the X number of virtual users, thus making server computer 18's CPU busier and decreasing the idle time. In this case, server test process 10 may increase the X number of virtual users until the measured CPU idle time decreases to 20% or comes within a margin of 20%. Likewise, if the measured CPU idle time is 10%, server test process 10 may decrease the X number of virtual users until the measured CPU idle time increases to 20% or comes within a margin of 20%.

The measured metric and the predetermined value may be any measurement or indicator of the performance of server computer 18 and/or server application 16. The metric and the value may be CPU load, CPU idle time, hard drive bandwidth, hard drive free space, network usage, number of software threads, or any other metric indicative of server computer 18's or server application 16's performance. In one embodiment, server test process 10 may measure 108 the metric by accessing a Windows Management Instrumentation (WMI) or rstat.d interface running on server computer 18. The WMI and/or the rstat.d service may be tools that provide statistics and measurements of performance metrics of server computer 18. Server test process 10 may access and measure 108 these WMI and/or rstat.d metrics. As one skilled in the art will recognize, any tool that provides a performance metric may be used, including, but not limited to: WMI, rstat.d, a custom measurement tool, or any other tool that may measure performance of server computer 18, for example. A custom measurement tool may be a software program and/or hardware tool developed in whole or in part for the purpose of measuring a metric of server computer 18.

The value of some metrics may vary or fluctuate. These fluctuations may cause false or inaccurate measurement results. The measurement of interest may be an aggregate or average of the fluctuating measurement, but variations and fluctuations in the value of the metric may throw off server test process 10. For example, if CPU load is a fluctuating metric, sequential measurements made by server test process 10 may fluctuate. Say for example, the target CPU value is 80% and the actual, median CPU load on server computer 18 is 80%, but, due to measurement error or the nature of the CPU load measurement, any individual measurement of server computer 18's CPU load may vary between 70% and 90%. In this case, server computer 18 is operating at the desired load, but any given measurement may fall anywhere between 70% and 90%. If a particular measurement is 70%, server test process may erroneously increase the number of virtual users. If a particular measurement is 90%, server test process may erroneously decrease the number of virtual users. If the metric fluctuates with each measurement, server test process 10 may change 112 the number of virtual users with each element and may not be able to reach a steady state condition.

To avoid such fluctuation, server test process 10 may measure 108 the metric multiple times and store 116 each measurement in a memory or computer readable storage device, such as storage device 22. If server test process 10 stores 116 a series of measurements, server test process 10 may aggregate 118 the measurements to remove measurement fluctuation. Server test process 10 may aggregate 118 the measurements by applying a rolling average—by storing the last few measurements and using the average of the last few measurements to determine whether to change 112 the number of virtual users. Server test process 10 may also apply a low-pass filter, such as a low-pass infinite input response (IIR) or finite input response (FIR) filter, to the last few stored measurements to remove the fluctuation in the measurements. In general, server test process 10 may aggregate 118 the measurements in any way that removes the fluctuation and variance from the measurements.

Server test process 10 may also record 114 the number of users associated with a particular metric and/or a particular operating point. For example, assume that a designer wants to know how many users it takes to create an 80% load on server computer 18's CPU. In this case, while testing server computer 18, server test process 10 may measure server computer 18's CPU load and change the number of virtual users until server computer 18's CPU load reaches 80% (or reaches a number within a preset margin of 80%). Server test process 10 may find that it had to simulate 10,000 virtual users for server computer 18's CPU load to reach 80%. Server test process 10 may then record 114 the number of users it found, i.e. 10,000, as the number of users required to exert an 80% load on server computer 18's CPU. Server test process 10 may record 114 the number of virtual users in a memory, a storage device, a file, a database, or in any other medium for storing data.

According to one example, server test process 10 may be used to determine a number of users required to reach a particular target load on a server. In another simplified example, if a target CPU load on server computer 18 is 50%, server test process may simulate 104 10,000 users. Server test process 10 may measure 108 the CPU load on server computer 18 and find that with 10,000 virtual users, server computer 18 is operating at 100%. To reach 50%, server test process 10 may change 112 the number of virtual users based on a percentage or ratio of the measured value (100%) and the predetermined value (50%). For example, since the predetermined value (50%) is half of the target value (100%), server test process 10 may decrease the number of users by half. Accordingly, server test process 10 may decrease the number of virtual users from 10,000 to 5,000 virtual users. Server test process 10 may repeat this process, increasing and decreasing the number of virtual users, until the measured metric is equal to the predetermined value or falls within a range of the predetermined value.

A number of embodiments have been described. However, the following claims define the scope of the invention.

What is claimed is:

1. A method of determining a number of users corresponding to a server load comprising:
   simulating one or more virtual users on a test computer system coupled to a network;
   sending one or more client requests from each of the one or more virtual users to a server application executed on a server computer system coupled to the network;
   measuring a metric indicative of a CPU idle time on the server computer system, wherein measuring the metric includes periodically measuring the metric and storing each measurement in a memory, and wherein measuring the metric includes one or more of:
   calculating a running average of the metric; and
   applying a low pass filter to the metric;
   comparing the metric to a predetermined value; and
   changing the number of the one or more virtual users based on the difference between the metric and the predetermined value until the metric is within a predetermined range of the predetermined value.

2. The method of claim 1 wherein the metric is indicative of a load on one or more processors of the server computer system.

3. The method of claim 1 wherein measuring the metric includes measuring a metric provided by one or more of:
 a Windows Management Instrumentation service executing on the server computer system;
 a performance measurement service executing on the server computer; and
 a custom measurement tool executing on the server computer.

4. The method of claim 1 wherein changing the number of the one or more virtual users includes changing the number of the one or more virtual users based on, at least in part, a percentage difference between the metric and the predetermined value.

5. A computer program product for determining a number of users corresponding to a server load, residing on a non-transitory computer readable medium, having a plurality of instructions stored thereon, which, when executed by a processor, cause the processor to perform operations comprising:
 simulating one or more virtual users on a test computer system coupled to a network;
 sending one or more client requests from each of the one or more virtual users to a server application executed on a server computer system coupled to the network;
 measuring a metric indicative of a CPU idle time on the server computer system, wherein measuring the metric includes periodically measuring the metric and storing each measurement in a memory, and wherein measuring the metric includes one or more of:
  calculating a running average of the metric; and
  applying a low pass filter to the metric;
 comparing the metric to a predetermined value; and
 changing the number of the one or more virtual users based on the difference between the metric and the predetermined value until the metric is within a predetermined range of the predetermined value.

6. The computer program product of claim 5 wherein the metric is indicative of a load on one or more processors of the server computer system.

7. The computer program of claim 5 wherein measuring the metric includes measuring a metric provided by one or more of:
 a Windows Management Instrumentation service executing on the server computer system;
 a performance measurement service executing on the server computer; and
 a custom measurement tool executing on the server computer.

8. The computer program of claim 5 wherein changing the number of the one or more virtual users includes changing the number of the one or more virtual users based on a percentage difference between the metric and the predetermined value.

9. A system for determining a number of users corresponding to a server load comprising:
 one or more processors;
 one or more memories;
 one or more software instruction sets stored on the one or more memories, which, when executed by the one or more processors, perform operations comprising:
  simulating one or more virtual users on a test computer system coupled to a network;
  sending one or more client requests from each of the one or more virtual users to a server application executed on a server computer system coupled to the network;
  measuring a metric indicative of a CPU idle time on the server computer system, wherein measuring the metric includes periodically measuring the metric and storing each measurement in a memory, and wherein measuring the metric includes one or more of:
   calculating a running average of the metric; and
   applying a low pass filter to the metric;
  comparing the metric to a predetermined value; and
  changing the number of the one or more virtual users based on the difference between the metric and the predetermined value until the metric is within a predetermined range of the predetermined value.

10. The system of claim 9 wherein the metric is indicative of a load on one or more processors of the server computer system.

11. The system of claim 9 wherein measuring the metric includes measuring a metric provided by one or more of:
 a Windows Management Instrumentation service executing on the server computer system;
 a performance measurement service executing on the server computer; and
 a custom measurement tool executing on the server computer.

12. The system of claim 9 wherein changing the number of the one or more virtual users includes changing the number of the one or more virtual users based on a percentage difference between the metric and the predetermined value.

13. A method of determining a number of users corresponding to a server load comprising:
 simulating one or more virtual users on a test computer system coupled to a network;
 sending one or more client requests from each of the one or more virtual users to a server application executed on a server computer system coupled to the network;
 measuring a metric indicative of a CPU load on the server computer system, wherein measuring the metric includes periodically measuring the metric and storing each measurement in a memory, and wherein measuring the metric includes one or more of:
  calculating a running average of the metric; and
  applying a low pass filter to the metric;
 comparing the metric to a predetermined value corresponding to a target CPU load on the server computer system; and
 changing the number of the one or more virtual users based on the difference between the metric and the predetermined value until the metric is within a predetermined range of the predetermined value, thereby determining about how many users are required to access the server application executed on the server computer system to reach the target CPU load on the server computer system.

* * * * *